July 5, 1949.  C. B. SCOTT  2,475,258
FEEDBACK AUTOMATIC VOLUME CONTROL
CIRCUIT FOR SEISMIC AMPLIFIERS
Filed April 4, 1946

INVENTOR.
Clarence B. Scott
BY
P. J. Whelan
ATTORNEY.

Patented July 5, 1949

2,475,258

UNITED STATES PATENT OFFICE 2,475,258

FEEDBACK AUTOMATIC VOLUME CONTROL CIRCUIT FOR SEISMIC AMPLIFIERS

Clarence B. Scott, Tulsa, Okla., assignor to Standard Oil Development Company, a corporation of Delaware Application April 4, 1946, Serial No. 659,466

1 Claim. (Cl. 179—171)

The present invention is directed to a circuit for use in the recording of electrical signals in such a manner as to provide automatic volume control.

In many arts there is encountered the necessity for recording a varying electrical signal. When this signal varies within wide limits, the difficulty encountered in the recording is that if the recording apparatus is made sufficiently sensitive to record the extremely low values, it usually is too sensitive to record the maximum values. This is particularly true in the art of seismic prospecting where seismic waves are received and converted into electrical values which are recorded on a moving strip of fixed dimensions. The energy received varies between fairly wide limits and it is desired to record all of it. Therefore, the difficulty arises that, when the recording apparatus is made sensitive enough to record low energy signals on the recording chart, it causes high energy signals to go off the chart. This same problem is encountered in many types of analyses such as mass spectrographic analyses, infra-red ray analyses, and the like.

In such arts, therefore, the expedient has been adopted of providing an automatic control on the sensitivity of the recorder or the amplifier which feeds the recorder, usually the latter, such that the greater the energy contained in the received signal the less will be the degree of amplification.

The principal objective of the present invention is the provision of a simple circuit for achieving the aforesaid desired objective.

Figure 1:
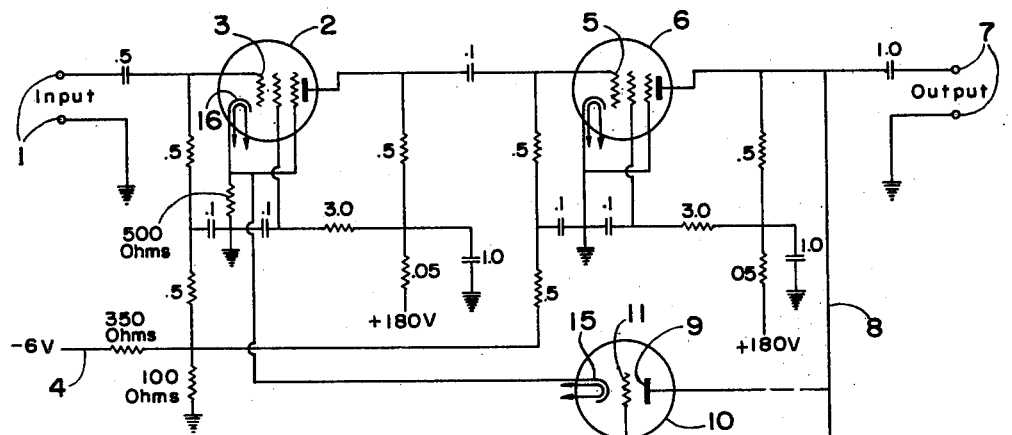
Figure 2:
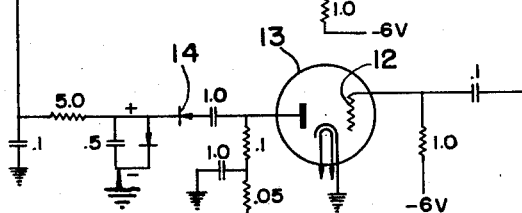
Figure 2:
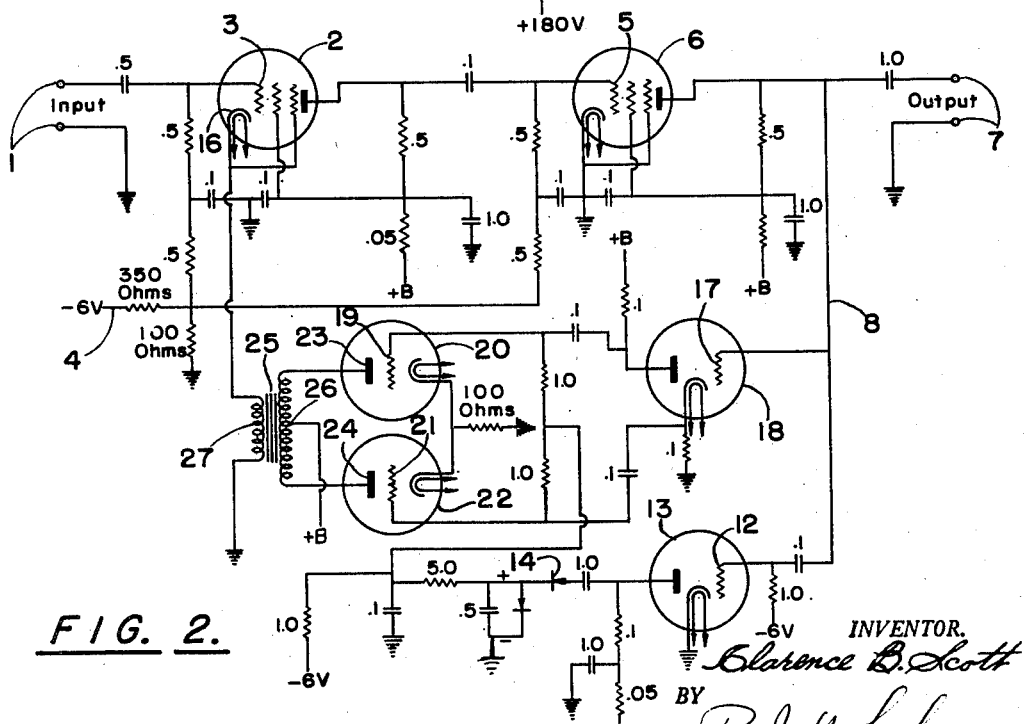

The nature of the present invention will be readily understood from the following detailed description of the accompanying drawings; in which, Fig. 1 is a schematic diagram of one form of circuit which constitutes one embodiment of the present invention; and, Fig. 2 is a similar view of an alternative embodiment of the present invention.

Referring to the drawing in detail, numeral 1 designates the terminals at which the varying signal is received. This signal is fed into a tube 2 which constitutes the first stage of amplification, the signal being applied to the grid 3 on which there is maintained a constant negative voltage from a source 4. In this particular tube the grid must be kept negative with respect to the cathode, the tube being a conventional pentode. As will be apparent, there is associated with this tube the usual circuit elements such as resistors, batteries, and condensers, all in the conventional manner. Since these constitute no part of the present invention, specific mention thereof will be omitted.

The plate voltage of tube 2 is coupled to the grid 5 of a second pentode 6 which constitutes the second stage of amplification. It will be understood that as many stages of amplification as desired may be employed simply by multiplying the number of these tubes.

The plate of tube 6 is connected to output terminals 7 to which is connected a recorder such as a recording galvanometer. A portion of the plate current from tube 6 is drawn off by way of conductor 8, which is connected to the plate 9 of control tube 10. In this tube a constant negative voltage is applied to the grid 11. This negative voltage is of such a value as normally to keep the tube extinguished; that is, to keep the plate resistance extremely high so that no current will pass through the tube. The conductor 8 is also coupled to the grid 12 of an amplifying triode 13, the plate of which is coupled to a rectifier 14, the output of which is fed to the grid 11 of the control tube 10.

The rectifier output is a positive voltage which acts in opposition to the fixed negative biasing voltage applied to the grid 11. As the positive voltage increases, the plate resistance decreases and permits current to flow through the tube. This current is taken off at the cathode 15 of the control tube and fed to the cathode 16 of the first stage of amplification. Since the output of tube 6 is in phase with the input to tube 3, the change in voltage on the cathode 16 by reason of the output of tube 10 acts in opposition to changing voltage on the grid 3 of the pentode tube, thereby decreasing the degree of amplification attained in pentodes 2 and 6. It may be observed here that where more than two stages of amplifications are used, the feedback to the cathode of the first tube may require the use of a transformer in the feedback line to insure that the feedback voltage is in phase with or opposes the varying grid voltage on the initial stage of amplification. If an even number of interposed tubes is employed, the transformer is unnecessary.

In this embodiment, as the plate resistance of control tube 10 is reduced, some direct current plate voltage passes through the tube and to the cathode 16 of pentode 2. This causes surges which appear on the record as deviations of the base line from its zero value, giving erratic records. This can be eliminated if desired by interposing a high pass filter between the terminal 7 and the recorder, which will exclude from the recorder these lower frequency surges. In some cases, however, it is undesirable to use a filter at this point and for this reason the embodiment of the present invention shown in Fig. 2 is preferred.

In the embodiment shown in Fig. 2, the circuit is the same up to the control tube 10. In this case conductor 8 is connected to the grid 17 of a phase changing tube 18 which puts out a plate signal and a cathode signal which are 180° out of phase with each other. The plate signal provides voltage for the grid 19 of one control tube 20, while the cathode signal provides voltage for the grid of a second control tube 22.

As in the case of Fig. 1, the output of the rectifier 14 is a positive voltage which opposes the fixed negative cutoff bias applied to grids 19 and 21 of control tubes 20 and 22 respectively. The plates 23 and 24 of tubes 20 and 22 respectively are connected to the end terminals of a transformer 25 which has a central tap 26 connected to a B battery to provide plate voltage for the tubes 20 and 22. The secondary 27 of this transformer is connected to ground and to the cathode 16 of pentode 2.

In this case, the surge effect is eliminated since it is balanced out by the action of transformer 25 and the tubes 20 and 22 as is clearly shown in the following explanation: Variations in bias voltage from rectifier 14 which produced surges in the circuit in Fig. 1 are applied in Fig. 2 to grids 19 and 21 of tubes 20 and 22 respectively in equal amounts and in phase. These grid bias variations produce plate current variations at plates 23 and 24 which are also equal and in phase. Since equal and in phase variations of current at end terminals 23 and 24 of the transformer winding for which terminal 26 is a center tap produce equal and opposing flux in transformer 25, no voltage is developed across secondary winding 27 of the transformer and no surge is applied to the amplifier stages formed by tubes 2 and 6.

The amplified signal voltage appearing on conductor 8 is applied to grids 19 and 21 of tubes 20 and 22 180° out of phase by virtue of phase changing tube 18 as previously explained. The signal voltage is therefore transmitted through control tubes 20 and 22 and transformer 25 and applied to the cathode 16 of tube 2 in such a manner as to oppose the input signal applied to terminals 1 of tube 2. The net gain of tubes 2 and 6 is thus automatically controlled by control tubes 20 and 22 in much the same manner as the gain was controlled by control tube 10 in Fig. 1.

While the various electrical elements shown in these circuits can have values over fairly wide ranges, for the sake of illustration, adjacent to each of the circuit elements on the drawing is a value for one operative combination. As to these values, the resistances are in megohms and the capacitances are in microfarads, except where otherwise noted.

The nature and objects of the present invention having been thus described and illustrated, what is claimed as new and useful and as desired to be secured by Letters Patent is:

An amplifying circuit for use in amplifying a varying electrical signal for recording, comprising a plurality of amplifier tubes, means for applying the varying signal to the grid of the first amplifier tube, means for taking off the amplified signal from the plate of the last amplifier tube, a feedback arrangement between the plate of the last amplifier tube and the cathode in the first amplifier tube, including a phase changing tube having its grid connected to the plate of the last amplifier tube and being of a character to produce a plate signal and a cathode signal 180° out of phase with each other, a pair of control tubes, one of which has its grid connected to the plate of said phase shifting tube and the other of which has its grid connected to the cathode of said phase shifting tube and both having their plates connected to opposite ends of the primary of a transformer, means for applying a rectified portion of the signal derived from the plate of the last amplifier tube in equal amounts and in phase to the grids of said control tubes, a central tap on said primary winding for applying plate voltage to said control tubes and means connecting the secondary of said transformer to the cathode of said first amplifier tube.

CLARENCE B. SCOTT.

REFERENCES CITED

The following references are of record in the file of this patent:

UNITED STATES PATENTS

| Number | Name | Date |
|---|---|---|
| 2,307,308 | Sorensen | Jan. 5, 1943 |
| 2,369,066 | Maxwell | Feb. 6, 1945 |